Sept. 23, 1952  A. A. ASHTON  2,611,249
SELECTOR CONTROL SYSTEM
Filed Nov. 14, 1949
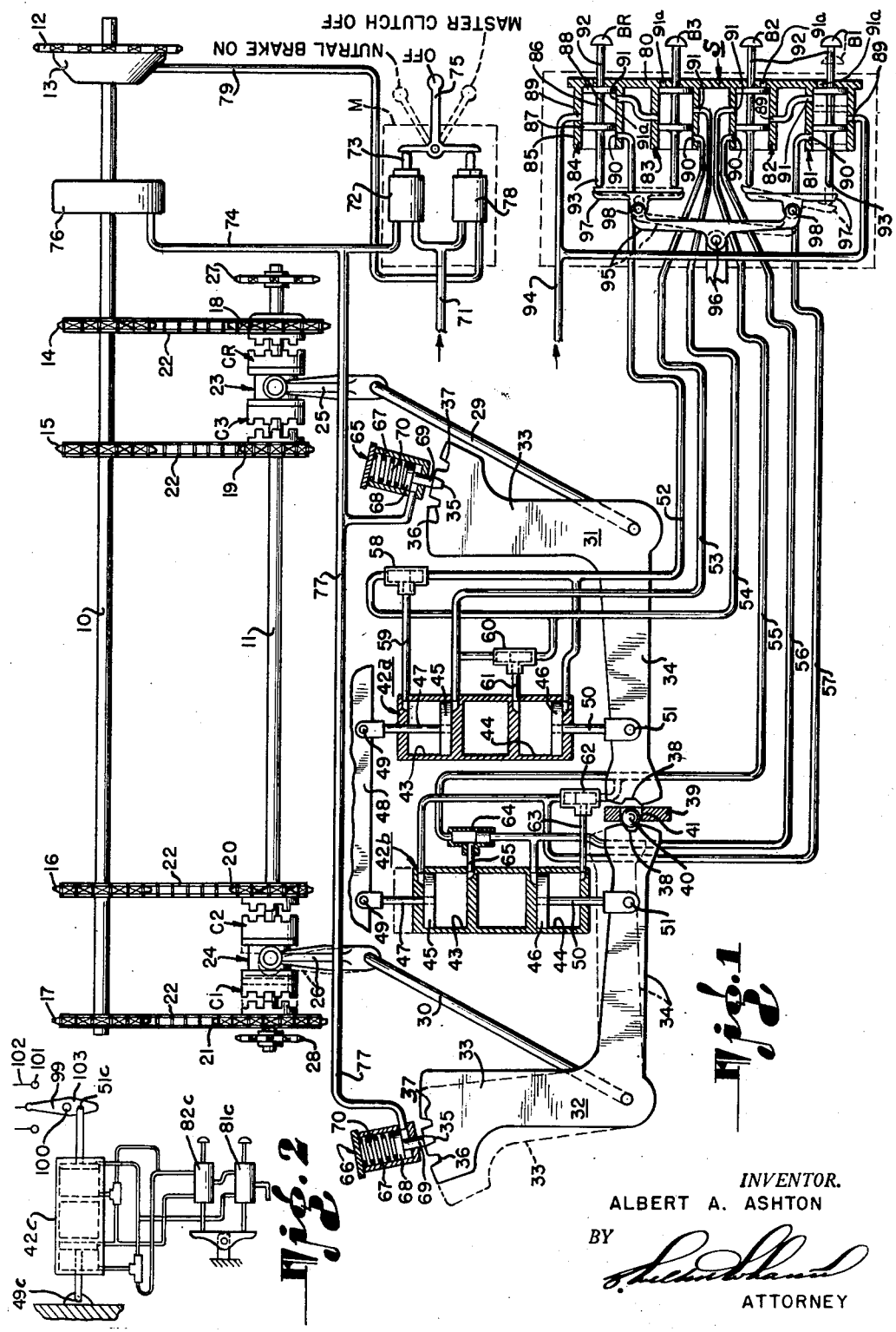
INVENTOR.
ALBERT A. ASHTON
BY
ATTORNEY Patented Sept. 23, 1952

2,611,249

UNITED STATES PATENT OFFICE 2,611,249

SELECTOR CONTROL SYSTEM

Albert A. Ashton, Houston, Tex., assignor to Emsco Derrick & Equipment Company, Los Angeles, Calif., a corporation of California Application November 14, 1949, Serial No. 127,231

6 Claims. (Cl. 60—97)

The present invention relates generally to a selector control system; and is more particularly concerned with pneumatic actuator means arranged for control from a remote push button station.

In its broad concept the invention is susceptible of general use as an actuator for positively positioning a control member in a plurality of positions for accomplishing desired mechanical or electrical operations. More specifically, for example, the invention is of special utility for selectively actuating transmissions of heavy equipment, such as drawworks employed in oil drilling rigs, and constitutes improvements in the copending application of Albert A. Ashton and Jack A. Amerman covering Preselective and Actuating Mechanism for Selective Speed Transmission, Serial No. 29,904, filed May 28, 1948, now Patent No. 2,556,834, issued June 12, 1951.

It is an object of the invention to provide improved actuating and control means for transmissions and other mechanisms, utilizing a fluid, such as air which may be controlled from a remote station, and wherein the actuating means is arranged so as to move an actuating member with positive action to a plurality of selectable positions.

A further object of the invention is to provide in a selector control system, fluid motor means utilizing simple piston and cylinder assemblies which are so interconnected and energizable that at least three positive positions of operation will be obtained, thus enabling the shifting of clutches and other operative devices to at least three positions of operation without the necessity of having to depend upon springs or other separate means to return the device to one position of its operation.

Still another object of the herein described invention is to provide a control system utilizing novel conduit connections and check valves for supplying fluid to a pair of interconnected cylinder and piston assemblies over three supply lines so as to simultaneously move the pistons to the bottom of their cylinders, the tops of the cylinders, or to positions wherein one piston is at the bottom of its cylinder and the other is at the top of its cylinder.

Further objects of the invention will be brought out in the following part of the specification, wherein detailed description is for the purpose of fully disclosing the invention without placing limitations on the scope of the invention defined in the appended claims.

Referring to the drawing, which is for illustrative purposes only:

Fig. 1 is a schematic view partly in section showing a multi-speed transmission which embodies a selector control system according to the present invention; and Fig. 2 is a view schematically illustrating the utilization of my selector system for operation of another device, such as an electrical circuit control switch.

Referring to Fig. 1 of the drawing, the selector control system of the present invention is schematically illustrated as being applied to a selective speed power transmission of a rotary drawworks, such as utilized in the oil well drilling industry. It will be understood that the present illustration constitutes a simplified disclosure, and in actual practice the various parts of the drawworks or the selective speed transmission may be otherwise arranged.

More specifically, a power shaft 10 is supported in parallel relation to a variable speed shaft 11, the power shaft being provided with a driving sprocket 12 connectible with a suitable power source and arranged to be connected to the power shaft 10 by means of a fluid operated clutch 13. Also carried by the power shaft 10 are a plurality of driving sprockets 14, 15, 16 and 17 keyed or otherwise secured to the shaft for rotation therewith.

For driving the shaft 11 at different speeds, driven sprockets 18, 19, 20 and 21 are loosely mounted on the shaft 11 and are respectively connected by flexible transmission means such as chains 22 with the sprockets 14, 15, 16 and 17. Jaw clutches CR, C3, C2, and C1 are provided for connecting the sprockets 18 to 21 respectively with the shaft 11, these clutches including clutch bodies 23 and 24 which are adapted to be moved axially on the shaft 11 by clutch shifting yokes 25 and 26. That is, the clutch body 23, when shifted to the right from its full line position as shown in Fig. 1, engages the reverse clutch CR and when shifted to the left will engage the high speed clutch C3. Similarly, the right and left shifting of clutch body 24 from its full line neutral position will cause engagement of the intermediate speed clutch C2 and the low speed clutch C1. Through the selective actuation of these clutches, it will be apparent that the variable speed shaft 11 may be driven at three different speeds, and at a reverse speed.

As illustrated, the shaft 11 is also provided with drive sprockets 27 and 28 of different size, these sprockets being arranged for connection through suitable chain drives with other parts of the drawworks, for example, the drawworks drum, and since the sprockets 27 and 28 are disposed in chain transmissions of different speed ratios, it is thus possible to obtain from the transmission shown six different forward speeds and two different reverse speeds.

The clutch shifting yokes 25 and 26 are respectively secured to shafts 29 and 30 which are connected with control members 31 and 32. The control members 31 and 32 are in the form of angle levers and are constructed for right and lefthand mounting. Each of the control members comprises angularly disposed arms 33 and 34, the arm 33 having an arcuate end portion having a neutral notch 35 and left and right notches 36 and 37, and the arm 34 being provided with an end notch 38.

The control members 31 and 32 are mounted with their arms 34—34 extending toward each other so that the end notches 38—38 will be disposed on opposite sides of a stationary support 39 having a drift ball 40 supported therein for free shifting movement in opposite horizontal directions within an opening 41 in the support. As thus arranged, the end notches 38—38 will be in registration with the opposite ends of the opening 41, when the control members 31 and 32 are in neutral positions at which time the clutch bodies 23 and 24 are disengaged from their associated clutches. At this time, the drift ball 40 is free to move in either direction into one of the notches 38 whenever the other control member is moved from neutral position. The control members 31 and 32 are thus mechanically interlocked so that whenever one of the control members is moved from its neutral position, the other control member is mechanically locked against movement until the control member which has been moved from neutral is again returned to neutral position.

A pair of fluid motors 42a and motor 42b are respectively provided for actuating the control members 31 and 32 in clockwise and counterclockwise directions of rotation for actuating the clutch bodies 23 and 24 to clutched and unclutched neutral positions. Each of the fluid operated motors comprises a pair of cylinders 43 and 44 which are rigidly interconnected in tandem relation, these cylinders respectively containing double action pistons 45 and 46. The piston 45 is connected by a piston rod 47 to a stationary frame member 48 by an end pivotal connection 49. The piston 46 connects with an oppositely extending piston rod 50 which is connected by a pivotal connection 51 at its outer end to the outermost end of the arm 34 of the associated control member.

Operating fluid for the fluid motor 42a is supplied through conduits 52, 53 and 54, and operating fluid for the fluid motor 42b is supplied through conduits 55, 56 and 57. The conduit 52 is directly connected with the outer end of cylinder 44 of the fluid motor 42a, and also connects to one of the main connections of a double check valve 58 which has its branch connection connected through a conduit 59 with the outer end of cylinder 43. The conduit 53 is directly connected with the inner end of cylinder 43 and to one of the main connections of double check valve 60 having its branch connection connected by a conduit 61 with the inner end of cylinder 44. The conduit 54 is respectively connected with the other main connections of the check valves 58 and 60.

In a similar manner, conduit 57 is directly connected to the outer end of cylinder 43 of fluid motor 42b, and to one of the main connections of double check valve 62 having its branch connection connected by a conduit 63 with the outer end of cylinder 44. The conduit 56 is directly connected to the inner end of cylinder 44, and to one of the main connections of double check valve 64 having its branch connection connected through a conduit 65 with the inner end of cylinder 43. The conduit 55 is connected with the other main connections respectively of the double check valves 62 and 64.

Since the operation of each of the fluid motors 42a and 42b is similar, it is believed that it will suffice to describe the operation of only one. The control member 31 is positively held in neutral position with the clutch body 23 disengaged with respect to clutches C3 and CR by supplying operating fluid to conduit 54. Operating fluid is furnished to the inner end of cylinder 44 and the outer end of cylinder 43 thus forcing the piston 46 to the outer end of the cylinder and shifting the cylinder 43 upward so that the piston 45 will then occupy a position at the inner end of the cylinder. If it is now desired to engage clutch CR, it may be accomplished by disconnecting the conduit 54 with respect to the fluid source and connecting conduit 52 which causes the double check valve 58 to operate and continue to supply fluid to the outer end of cylinder 43 and thus maintain the cylinder in a position wherein the piston 45 will occupy a position at the inner end of the cylinder. Operating fluid is now supplied to the outer end of cylinder 44 which will cause the piston 46 to move to the inner end of the cylinder to rotate the control member 31 in a clockwise direction which moves the clutch body 23 to the right to actuate clutch CR. In this position of operation, it will be noted that the pistons 45 and 46 are both disposed at the inner ends of their cylinders. If it is now desired to engage the clutch C3, this is accomplished by disconnecting conduit 52 with respect to the fluid supply source and connecting conduit 53 which will now push fluid into the inner ends of both cylinders 43 and 44 to force shifting of the cylinder so that their pistons 45 and 46 will occupy a position at the outer ends of said cylinders and move the control member 31 in a counter-clockwise direction so that the clutch body 23 now engages the clutch C3.

Lock means 65 and 66 are respectively provided for locking the control members 31 and 32 in their neutral and clutched operating positions. Each lock means comprises a cylinder 67 having a slidably mounted piston 68 therein, the piston having a projecting stem 69 which projects from the lowermost end of the cylinder and is adapted to engage the notches 35, 36 and 37 associated with the arm 33 of the control member. The piston is urged in an engaging direction of the stem 69 by means of a compression spring 70 in the upper portion of the cylinder. The piston 68 is movable to disengage the stem 69, when fluid pressure is supplied to the lowermost end of the cylinder 67.

Operating fluid for raising the pistons 68 is obtained from a fluid supply conduit 71, this supply being controlled by a valve 72 of a master control M. The valve 72 is of the pressure applying and releasing type. That is, when an operating stem 73 of the valve is in released extended position, connected distributing conduit 74 will be connected to exhaust or atmosphere, and when the operating stem 73 is pressed inwardly by raising an operating lever 75, the fluid supply conduit 71 will be connected to the conduit 74. The conduit 74 is connected to an air actuated brake 76 for stopping the rotation of the shaft 10. Through a branch conduit 77, the conduit 74 is connected to the cylinders 67—67 of the respective lock means 65 and 66.

For controlling the master clutch 13, the master control M is additionally provided with a control valve 78 of the same type as valve 72, the valve 78 being arranged so that downward movement of the operating lever 75 will actuate the valve to connect the fluid supply conduit 71 with distribution conduit 79 connected with the air chamber of the master clutch 13. When the control lever 75 is in neutral position, as shown in full lines, the control valve 78 will connect conduit 79 with atmosphere so that atmospheric pressure will exist in the air chamber of the clutch 13.

For selecting and controlling the operation of the fluid operated motors 42a and 42b, a remote speed selecting control station S is provided which may be located together with the master control M at any desired operating point or location. For example, in well drilling installations, the controls may be placed in the driller's position at the front of the drawworks where it may be conveniently operated by the driller.

The control station S is shown as embodying a control panel 80 having a plurality of three-way control valves 81, 82, 83 and 84 supported on its back surface, preferably in aligned relation. Each of these valves comprises an open ended cylinder 85 within which there is reciprocably mounted a slide valve member 86 having spaced pistons 87 and 88 which are permanently interconnected. The cylinder has a single inlet connection or port 89 which is alternately connected by sliding movement of the valve member 86 to outlet connections or ports 90 and 91, the outlet connection which is not connected to the supply being connected for exhausting to atmosphere through port 91a. Each valve member 86 is provided with a forwardly projecting stem 92 and a rearwardly projecting stem 93. The stems 92 of the valves 81, 82, 83 and 84 are extended through the control panel 80 and respectively provided with knobs to define push knobs or buttons B1, B2, B3 or BR identifying the forward and reverse speeds.

Operating fluid is supplied to control station S through a supply conduit 94 which is connected to the respective inlet connections of valves 81 and 84. The outlet connection 90 of valve 84 is connected to conduit 52, and the outlet connection 91 is connected to the inlet connection of valve 83. The outlet connection 90 of valve 83 is connected to conduit 53, and outlet connection 91 to conduit 54. Outlet connection 90 of valve 81 is connected to conduit 57, and outlet connection 91 to the inlet connection 89 of valve 82. Outlet connection 90 of valve 82 is connected to conduit 56, and outlet connection 91 is connected to conduit 55.

The push buttons B1, B2, B3 and BR are normally disposed at the outermost limits of their travel so that for operating purposes the push buttons are pushed inwardly towards the panel 80. The push buttons are mechanically interlocked so that only one push button may be pushed in at a time, and such action will operate to move any other push button which may have been pushed into its outermost position of operation. This is accomplished by means of a primary lever 95 which is fulcrumed intermediate its ends on a stationary pivot 96 for swinging movement. Secondary levers 97 are respectively fulcrumed intermediate their ends on pivots 98 at the ends of the primary lever 95. The ends of the secondary levers are positioned in the path of movement of the respective stems 93 of the valves 81, 82, 83 and 84.

For describing the operation of the selector control system of the present invention, let it be assumed that it is desired to actuate the clutch C1 so as to connect the power shaft 10 to drive the shaft 11 at slow speed. With the controls and various parts in the position shown in full line in Fig. 1, the push buttons B1, B2, B3 and BR being at their outermost limits of travel, and the operating lever 75 being in "off" position, the first operative step is to push in the push button B1 to the position shown in dotted lines. This movement will act to swing the secondary lever 97 associated with valves 81 and 82 in a clockwise direction about its pivot 98 and at the same time move the primary lever 95 in a clockwise direction about its pivot 96 so as to carry the secondary lever 97 associated with the valves 83 and 84 into restraining engagement with the stems 93—93 of the push buttons B3 and BR. This will lock the push buttons B2, B3 and BR against inward pushing movement which would result in resetting all the push buttons in their outermost positions. The actuation of the valve 81 will connect supply conduit 94 with conduit 57, and at the same time connect its outlet 91 with exhaust to permit exhausting flow of fluid through conduit 55, valve 82 and port 91a to atmosphere.

The supply of fluid to conduit 57 will actuate the double check valve 62 so as to continue the supply of fluid into cylinder 44 so as to hold the piston therein at its position at the inner end of the cylinder, and simultaneously will put pressure into the outer end of cylinder 43 so as to force said cylinder to move to a position whereat the associated piston 45 will occupy a position at the inner end of the cylinder. This action will shorten the linkage connection between the pivotal connections 49 and 51 with the result that the control member 32 will be rotated counter-clockwise to the position shown in dotted lines as soon as released by the actuation of lock means 66. In other words, at this point of the operation, the control is put in preset energized condition.

The next operative step is for the operator to raise the operating lever 75 to the "Neutral Brake-On" position as shown in dotted lines. This will open the valve 72 and allow fluid pressure to pass from supply conduit 71 through the conduits 74 and 77 to release lock means 65 and 66. The fluid motor 42b being energized as previously explained will immediately act to shift the control member 32 to the dotted line position, thus moving the clutch body 24 to operate the clutch C1 into engaged position.

At the same time, when the lever 75 is raised, fluid under pressure is supplied through conduit 74 to the brake 76, thereby stopping rotation of shaft 10. As the control member 32 operates to close the clutch C1, movement of its arm 34 acts to push the drift ball 40 to the right into the notch 38 of control member 31, so that this member is now mechanically locked against any movement from its neutral position, until the control member 32 is again returned to neutral position.

For the next operation, the operator moves the control lever 75 downwardly through "off" position to the dotted line position marked "Master Clutch On." Passage of the control lever 66 through the "off" position permits valve 72 to operate so as to connect conduit 74 to exhaust, thereby releasing the pressure from the brake 76 and the cylinders 67 of the lock means 65 and 66 so that the stems 69 will move into the aligned notches of the control members, notch 35 of control member 31 and notch 37 of control member 32, the latter locking the clutch C1 in engagement. Upon reaching the "Master Clutch On" position, the lever 75 opens valve 78 to supply fluid pressure from supply conduit 71 to conduit 79, thereby connecting shaft 10 with the power source and driving shaft 11 at the desired speed through clutch connection C1. In a similar manner, the other push buttons may be actuated to connect the desired clutch or reverse to give the speed selected.

While the selector control system of the present invention has been described in detail with reference to its application in connection with a multi-speed transmission such as utilized in connection with drawworks, as before mentioned the selector control system may be utilized for other purposes, such for example when operating switching means for control of a plurality of electrical circuits. The fluid motor assemblies are particularly adapted for the operation of switch parts as the novel assembly of cylinders and pistons as embodied in the fluid motors is such that positive operating positions will result. Such an arrangement is diagrammatically illustrated in Fig. 2 which shows a two-button control which operates valves 81c and 82c in the manner previously described to control a fluid motor 42c forming an operative link connection between pivot points 49c and 51c, the latter being connected to a pivoted switch arm 99 rotatable about pivot 100 and adapted at its outermost end for making selective connection with switch points 101 respectively connected to electric circuits 102. The switch arm 99 is in this case connected to a common conductor 103 which may selectively be connected to any one of the switch points 101 and their associated branch circuits by simply operating the push buttons of valves 81c and 82c in the manner previously explained.

I claim:

1. A selector control system, comprising: a movably mounted control member; a pair of fluid cylinders connected in end-to-end relation containing operatively associated pistons having connected piston rods extending from the opposite ends of the connected cylinders, one of said rods being fixedly anchored and the other being connected to said control member; a first fluid supply conduit connected to the inner adjacent ends of said cylinders, the connection to one of said ends being through a double check valve; a second fluid supply conduit connected to the outer ends of said cylinders, the connection to one end being through a double check valve; a third fluid supply conduit connected through said double check valves with one of said inner adjacent cylinder ends and one of said outer cylinder ends; and manually operable valve means for selectively connecting a fluid pressure supply with said supply conduits.

2. A selector control system, comprising: a movably mounted control member; a pair of fluid cylinders connected in end-to-end relation containing operatively associated pistons having connected piston rods extending from the opposite ends of the connected cylinders, one of said rods being fixedly anchored and the other being connected to said control member; a pair of three-way valves, each of said valves having an inlet port, a pair of outlet ports and means for connecting said inlet port alternately to said outlet ports; a first fluid supply conduit connecting an outlet port of the first of said three-way valves to the inner adjacent ends of said cylinders, the connection to one of said ends being through a double check valve; a second fluid supply conduit connecting an outlet port of the second of said three-way valves to the outer ends of said cylinders, the connection to one end being through a double check valve; a third fluid supply conduit connecting the other outlet port of said second three-way valve through said double check valves with one of said inner adjacent cylinder ends and one of said outer cylinder ends; a fluid supply conduit connected to the inlet port of said first three-way valve; and a duct connecting the remaining outlet port of said first three-way valve with the inlet port of said second three-way valve.

3. In a fluid operated selective control means: a pair of fluid cylinders connected in end-to-end relation containing operatively associated pistons having connected piston rods extending from the opposite ends of the connected cylinders; a first fluid supply conduit connected to first selected ends of said cylinders the connection to one of said ends being through a double check valve; a second fluid supply conduit connected to the remaining ends of said cylinders, the connection to one of said ends being through a double check valve; a third fluid supply conduit connected through said double check valves with one of said first selected ends of said cylinders and one of said remaining ends of said cylinders; and manually operable valve means for selectively connecting a fluid pressure supply with said supply conduits.

4. In a fluid operated selective control means: a pair of fluid cylinders connected in end-to-end relation containing operatively associated pistons having connected piston rods extending from the opposite ends of the connected cylinders; a pair of three-way valves, each of said valves having an inlet port, a pair of outlet ports and means for connecting said inlet port alternately to said outlet ports; a first fluid supply conduit connecting an outlet port of the first of said three-way valves to first selected ends of said cylinders the connection to one of said ends being through a double check valve; a second fluid supply conduit connecting an outlet port of the second of said three-way valves to the remaining ends of said cylinders, the connection to one of said ends being through a double check valve; a third fluid supply conduit connecting the other outlet port of said second three-way valve through said double check valves with one of said first selected ends of said cylinders and one of said remaining ends of said cylinders; and a fluid supply conduit connected to the inlet port of said first three-way valve; and a duct connecting the remaining outlet port of said first three-way valve with the inlet port of said second three-way valve.

5. In a fluid operated selective control means: a pair of fluid cylinders, pistons having connected piston rods extending from the ends of the connected cylinders; a first fluid supply conduit connected to first selected ends of said cylinders the connection to one of said ends being through a double check valve; a second fluid supply conduit connected to the remaining ends of said cylinders, the connection to one of said ends being through a double check valve; a third fluid supply conduit connected through said double check valves with one of said first selected ends of said cylinders and one of said remaining ends of said cylinders; and manually operable valve means for selectively connecting a fluid pressure supply with said supply conduits.

6. In a fluid operated selective control means: a pair of fluid cylinders, pistons having connected piston rods extending from the ends of the connected cylinders; a pair of three-way valves, each of said valves having an inlet port, a pair of outlet ports and means for connecting said inlet port alternately to said outlet ports; a first fluid supply conduit connecting an outlet port of the first of said three-way valves to first selected ends of said cylinders the connection to one of said ends being through a double check valve; a second fluid supply conduit connecting an outlet port of the second of three-way valves to the remaining ends of said cylinders, the connection to one of said ends being through a double check valve; a third fluid supply conduit connecting the other outlet port of said second three-way valve through said double check valves with one of said first selected ends of said cylinders and one of said remaining ends of said cylinder; and a fluid supply conduit connected to the inlet port of said first three-way valve; and a duct connecting the remaining outlet port of said first three-way valve with the inlet port of said second three-way valve.

ALBERT A. ASHTON.

REFERENCES CITED

The following references are of record in the file of this patent:

UNITED STATES PATENTS

| Number | Name | Date |
|---|---|---|
| 882,091 | Balloco | Mar. 17, 1908 |
| 941,426 | Loudon | Nov. 30, 1909 |
| 1,914,255 | Hodgkins | June 13, 1933 |
| 2,383,277 | Stevens | Aug. 21, 1945 |
| 2,384,447 | Baldwin et al. | Sept. 11, 1945 |
| 2,393,503 | Bosomworth et al. | Jan. 22, 1946 |
| 2,400,442 | Stevens | May 14, 1946 |
| 2,438,691 | Armantrout | Mar. 30, 1948 |
| 2,480,036 | Lloyd et al. | Aug. 23, 1949 |
| 2,510,697 | Jacoby | June 6, 1950 |